March 25, 1969  J. W. SCHALLER  3,434,226
PULSE DISCRIMINATING HIT INDICATOR ARRANGEMENT
Filed Feb. 28, 1967  Sheet 1 of 3
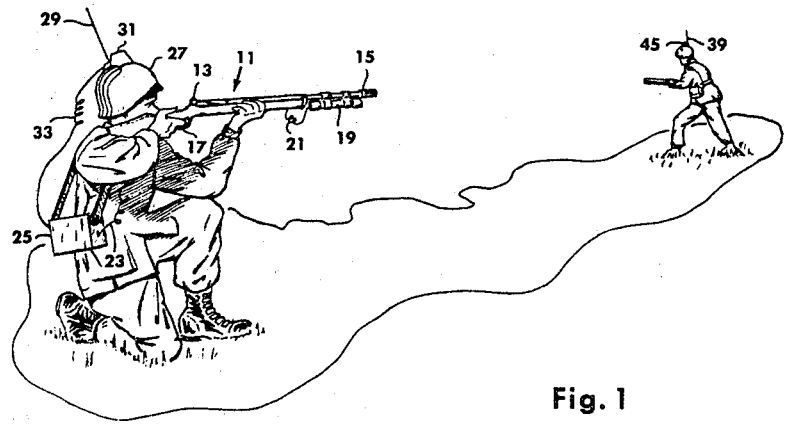
Fig. 1
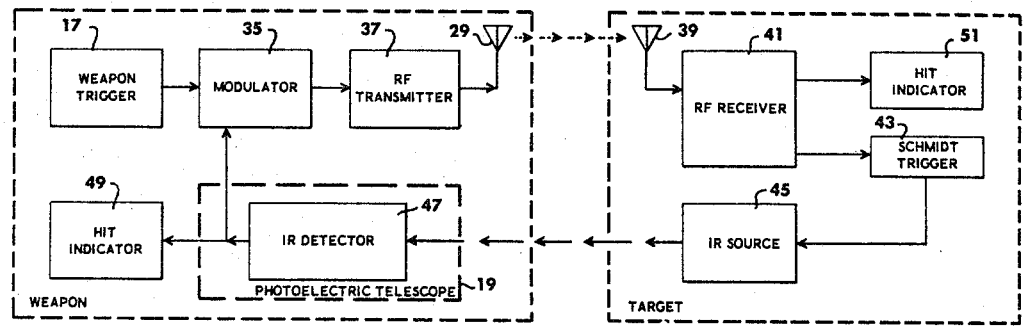
PRIOR ART  Fig. 2
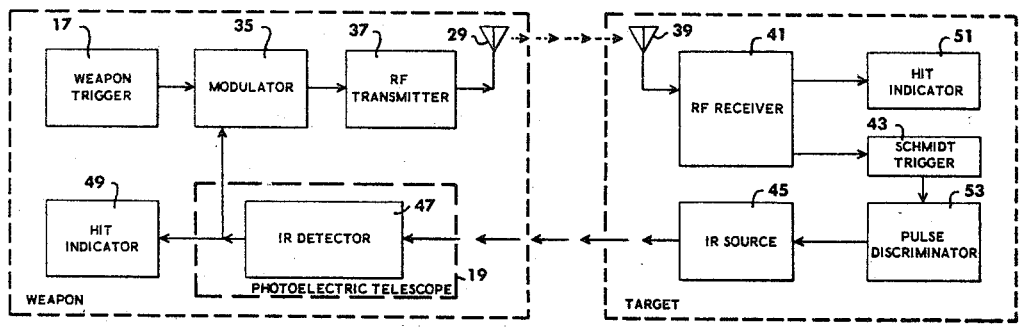
Fig. 3
INVENTOR.
JOHN W. SCHALLER United States Patent Office 3,434,226
Patented Mar. 25, 1969

3,434,226
PULSE DISCRIMINATING HIT INDICATOR
ARRANGEMENT
John W. Schaller, Timonium, Md., assignor to AAI
Corporation, Cockeysville, Md., a corporation of
Maryland
Filed Feb. 28, 1967, Ser. No. 619,398
Int. Cl. F41g 3/26; A63f 9/02; G01s 3/00
U.S. Cl. 35—25                              7 Claims

ABSTRACT OF THE DISCLOSURE

A hit indicator arrangement is disclosed for simulated hit-kill field practice which utilizes a pulse discriminator to prevent pulses having less than a predetermined time duration from actuating a light source in response to signals detected by a radio frequency receiver. The arrangement is an improvement particularly applicable to hit indicator arrangements as shown in U.S. Patent No. 3,104,478.

Figure 4:
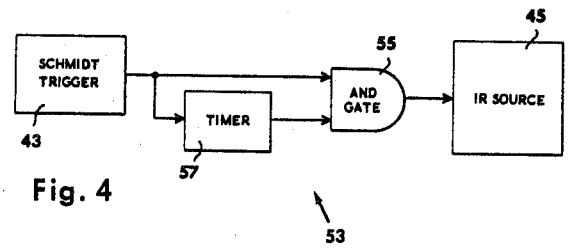

In a hit indicator system arrangement of the type disclosed in U.S. Patent No. 3,104,478, apparatus is attached to a weapon, which, for illustrative purposes only, may be considered to be a rifle, so that when a gunner, in this case a rifleman, fires the rifle at a target, a pulse is produced which causes an omnidirectional radio frequency target interrogation signal to be transmitted. The radio frequency signal is detected at the target by a receiver which operates a Schmidt trigger to cause a pulse to be supplied to an infrared source mounted on the target which is thereby actuated to radiate a light signal. The pulse supplied to the infrared light source has a duration generally corresponding to the duration of the detected radio frequency signal. If the rifle is properly aimed, a photoelectrically responsive element, disposed at, or near, the focal plane of a telescopic lens arrangement, such being hereinafter referred to as a photoscope or photoelectric telescope, which is attached to the rifle will receive the infrared signal and produce an electrical output signal which may desirably cause the apparatus to produce another radio frequency signal which informs the target that a hit has been scored. In addition, or alternatively, the rifle connected apparatus may desirably produce a signal informing the rifleman that a hit has been scored.

In determining the particular radio frequency transmitter and receiver which are to be used in a hit indicator system, the power of the transmitter and the sensitivity of the receiver are variables which must be considered in relation to each other; that is to say, the more powerful the transmitter is, the less sensitive the receiver need be, and vice versa. Given any transmitter and receiver combination to be used over a particular range, there is a choice between using either a more powerful transmitter or a more sensitive receiver. However, it has been found that practical considerations limit the power of the transmitter which can be used. The power of the transmitter is limited by the source of power available to operate it, and in a hit indicator system designed for use by opposing riflemen, each rifleman must carry his own power supply. Since the purpose of a hit indicator system is to permit the tactical field training of personnel on as realistic a basis as possible, it is necessary to use a power supply which is not so heavy as to hinder the movements of the rifleman. Accordingly, it has been found necessary in operating over a given range to increase the sensitivity of the radio frequency receiver rather than the power of the transmitter.

However, with the increased sensitivity of the radio frequency receiver, it has been found that a random noise signal, which, for example, may be produced by the ignition systems of cars, trucks, tanks, and other motor vehicles participating in the tactical field training in the general vicinity of the target, may cause the radio frequency receiver to operate the Schmidt trigger to generate a pulse which in turn actuates the infrared light source. The light signal produced in response to a noise signal, may result in a false hit being registered by a rifle pointed in the direction of the target. Since this would defeat the purpose of the hit indicator system, it is desirable that the radio frequency receiver cause the infrared light source to produce a light signal only in response to a target interrogation signal initiated by the firing of a rifle by a rifleman. Accordingly, means must be provided to prevent the infrared light source from being actuated in response to a noise signal detected by the radio frequency receiver. It has been found that substantially all noise signals detected by the receiver will result in pulses normally having a duration of less than 75 microseconds. Since the desired target interrogation signals are selected to have a duration much longer than 75 microseconds, a false hit can usually be avoided by preventing a pulse, resulting from the detection of a signal by the receiver, from actuating the infrared light source for a period of 75 microseconds. Accordingly, it is a feature of this invention to provide apparatus which supplies a pulse to the infrared light source in response to the detection of a signal by the radio frequency receiver only if the signal has a duration greater than 75 microseconds.

In accordance with the present invention, there is provided a pulse discriminator having an input terminal which is connected to the Schmidt trigger, an output terminal which is connected to the infrared light source, a first switch connected to the input terminal, and a second switch which is controlled by a timing device. When a signal is detected by the receiver, it operates the Schmidt trigger so as to supply a pulse to the input terminal of the pulse discriminator. This incoming pulse operates the first switch and initiates the operation of the timing device. After a predetermined period of time, depending on the characteristics of the timing device, which, in this instance, may be set for 75 microseconds, the timing device completes its cycle thereby operating the second switch. At this time, provided the incoming pulse has a duration greater than the predetermined period of time and, therefore, is still present, the pulse discriminator supplies a pulse which actuates the infrared light source. However, if the incoming pulse has a duration shorter than the predetermined period of time, the termination of the incoming pulse will return the first switch to its previous condition, stop the operation of the timing device, and prevent the operation of the second switch. Therefore, the pulse discriminator will not supply a pulse to actuate the infrared light source. Since all target interrogation signals are selected to have a duration greater than the predetermined period of time, they will always result in pulses which will actuate the infrared light source. However, since noise signals normally have a duration less than the predetermined period of time, the pulse discriminator will usually prevent the actuation of the infrared light source in response to a noise signal. In the event that several riflemen participate in the tactical field training, a coding system such as of the type disclosed in U.S. Patent No. 3,104,478, may be utilized to distinguish between various weapons and targets, in which instance, for example, the coding arrangement may be suitably arranged in the hit indicator system between the pulse discriminator and the infrared light source.

Figure 5:
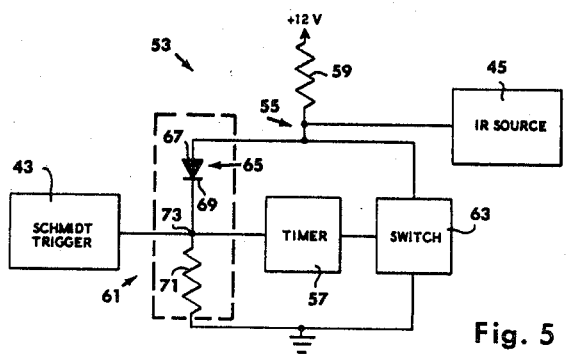
Figure 6:
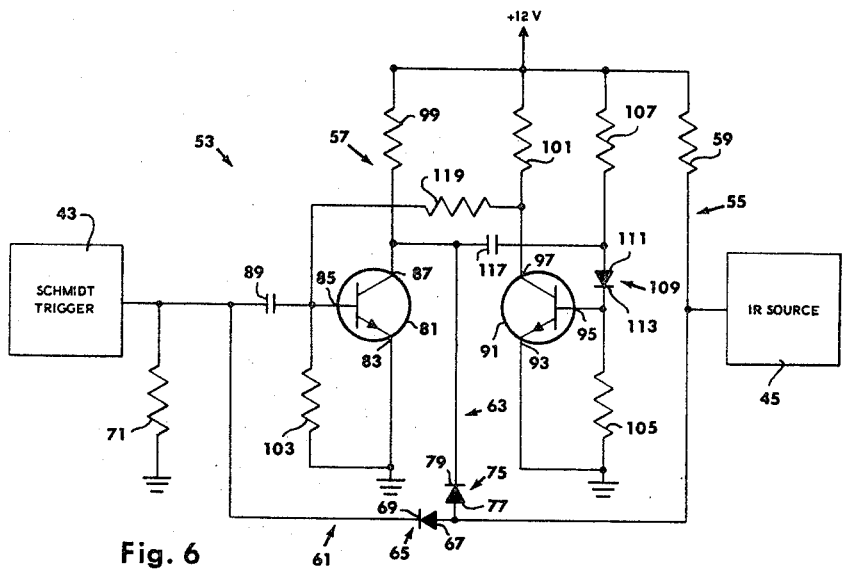
Figure 8:
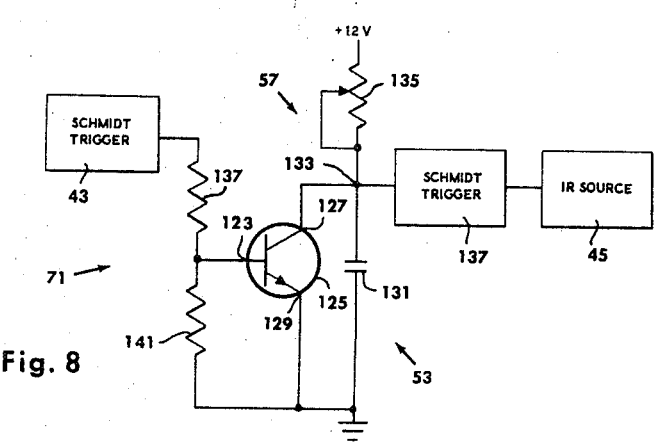
Figure 7:
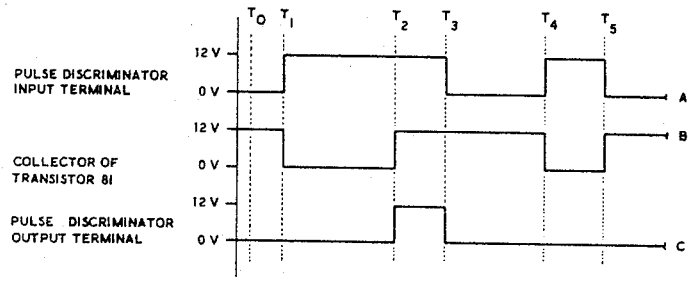
Figure 9:
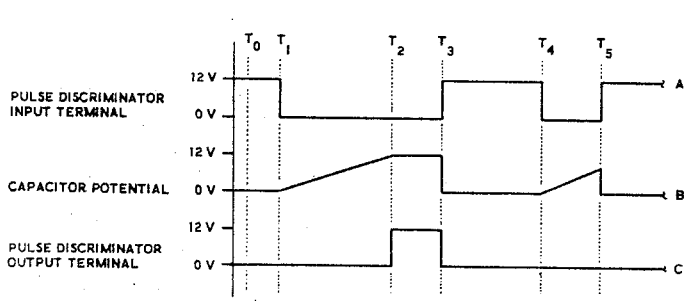

Still other objects, features and attendant advantages will become apparent to those skilled in the art from a reading of the following detailed description of one physical embodiment constructed in accordance with the invention, taken in conjunction with the accompanying drawings wherein:

FIG. 1 is a pictorial view of opposing riflemen utilizing a hit indicator system employing the present invention, FIG. 2 is a block diagram of a hit indicator system, FIG. 3 is a block diagram of a hit indicator system with a pulse discriminator according to the invention, FIG. 4 is a block diagram of a pulse discriminator according to the invention and having a gate circuit and a timing device, FIG. 5 shows a pulse discriminator according to the invention, including a gate circuit in schematic form and a time-controlled switch in block form, FIG. 6 is a circuit schematic of a gate circuit and a monostable multivibrator pulse width discriminator arrangement according to the invention, FIG. 7 shows the wave forms illustrating the operation of the invention as shown in FIG. 5, FIG. 8 shows another embodiment of the present invention comprising a pulse width discriminator with a switch controlled timing circuit which operates a Schmidt trigger, FIG. 9 shows the wave forms which illustrate the operation of the circuit as shown in FIG. 8.

Referring now in detail to the figures of the drawings, FIG. 1 shows a situation likely to arise during tactical field training, wherein a rifleman has spotted and aimed his rifle at a target which, in this case, is an enemy rifleman. The equipment normally worn and carried by both riflemen during tactical field training when employing a hit indicator system according to U.S. Patent No. 3,104,478 and the present invention includes a rifle generally indicated at 11 with aiming elements 13 and 15, and a trigger 17, a photoscope 19 containing an infrared detector is attached to the rifle 11 and connected by means of conductive cable 21 and 23 to a portable pack 25 containing the present invention and the electrical apparatus used in a hit indicator system as described in the referenced patent. Associated with trigger 17 is a pulse-initiating device which is connected by means of conductive cable 27 to the portable pack 25. Mounted on the helmet 27 is an omnidirectional radio frequency antenna 29 and an infrared source 31, both of which are connected by means of conductive cable 33 to the portable pack 25. As can be readily seen, both riflemen carry the same equipment so that the term "target" is actually relative, depending upon which rifleman is being fired at.

As shown in FIG. 2, the firing of the rifle 11 by operating the trigger 17 supplies a pulse to a modulator 35 which turns on a radio frequency transmitter 37 thereby causing a radio frequency target interrogation signal to be transmitted omnidirectionally from the antenna 29 mounted on the helmet 27 of the rifleman. This signal is received by an antenna 39 at the target and detected in a receiver 41. The receiver operates a Schmidt trigger 43 which causes a pulse to be supplied to the infrared light source 45 which is thereby actuated to radiate a light signal. If the rifle is properly aimed at the target, the light signal will be received by the infrared detector 47 which is contained in the photoscope 19. The light signal impinging on the infrared detector 47 causes an electrical pulse to be supplied to both the modulator 35 and the hit indicator 49 of the rifleman. The pulse supplied to the modulator 35 causes another radio frequency signal to be transmitted to the target, which actuates the target's hit indicator 51, thereby informing it that a hit has been scored. The pulse supplied to the rifleman's hit indicator 49 actuates it and likewise informs the rifleman that a hit has been scored.

However, during the course of the tactical field training it often happens that a noise signal is received by the target antenna 39 and detected by the radio frequency receiver 41. A noise signal may be caused by a number of things, for instance the ignition systems of cars, trucks, tanks and other motor vehicles which may be in the vicinity of the target. Since the radio frequency receiver 41 does not distinguish between a noise signal and a true target interrogation signal, a noise signal may result in a pulse which will actuate the infrared light source 45 in the same manner as any target interrogation signal. The light signal from the infrared source 45 may be received by the infrared detector 47 contained in the photoscope 19 attached to a rifle 11 and result in pulses being supplied to the hit indicators 49 and 51 of both the rifleman and the target, thereby registering a false hit.

The pulse supplied to the infrared light source 45 has a duration generally corresponding to the duration of the detected radio frequency signal, and it has been found that the pulses resulting from the detection of noise signals by the receiver 41 normally have a duration much shorter than a true target interrogation signal. Utilizing this characteristic, it has been found according to this invention that prevention of actuation of the infrared light source 45 by a pulse resulting from a noise signal may be effected by employing an improved circuit arrangement with a desired pulse width discriminator 53 between the Schmidt trigger 43 and the infrared light source 45. Accordingly, in FIG. 3 is shown a hit indicator system which is identical to that shown in FIG. 2, but includes a pulse width discriminator 53 having an input terminal connected to the Schmidt trigger 43, an output terminal connected to the infrared light source 45, and a timing device, which is responsive to an incoming pulse from the Schmidt trigger 43 to initiate its operation and cause a pulse to be supplied to the output terminal after a predetermined period of time, provided the incoming pulse is still present. With the pulse discriminator 53 inserted between the Schmidt trigger 43 and the infrared light source 45, the circuit will not operate in the following manner.

When the rifle trigger 17 is squeezed a pulse is supplied to the modulator 35 which turns on the radio frequency transmitter 37 and causes a target interrogation signal to be transmitted omnidirectionally from the antenna 29 mounted on the helmet 27 of the rifleman. This signal is received by the target antenna 39 and detected in the receiver 41 which operates the Schmidt trigger 43 to supply a pulse to the pulse discriminator 53, which prevents the immediate actuation of the infrared light source 45 by the incoming pulse. However, the incoming pulse initiates the operation of the timing device in the pulse discriminator 53. After a predetermined period of time, depending on the characteristics of the timing device which, in this instance, may be set for 75 microseconds, the timing device completes its cycle and, provided the incoming pulse from the Schmidt trigger 43 is still present, the pulse discriminator 53 supplies a pulse which actuates the infrared light source 45 and causes it to radiate a light signal. If the incoming pulse from the Schmidt trigger 43 results from the detection of a noise signal by the radio frequency receiver 41, then the incoming pulse will normally terminate before the timing device completes its cycle and the pulse discriminator 53 will not supply an actuating pulse to the infrared light source 45. Consequently, there will be no light signal and a false hit will not be registered. However, if the incoming pulse results from the detection of a target interrogation signal, which is selected to have a duration much greater than the predetermined period of time, then the incoming pulse will be present when the timing device completes its cycle and the pulse discriminator 53 will supply an actuating pulse to the infrared light source 45, which will radiate a light signal. If the rifle 11 is properly aimed, the light signal will be received by the infrared detector 47 which is contained in the photoscope 19 and cause a pulse to be supplied to the modulator 35 and the hit indicator 49 of the rifleman. The pulse supplied to the modulator 35 will cause another radio frequency signal to be transmitted to the target which actuates the target hit indicator 51 so as to inform the target that a hit has been scored. The pulse supplied to the rifle hit indicator 49 actuates it and likewise informs the rifleman that a hit has been scored.

In FIG. 4 is shown, in block form, a pulse discriminator employed in the circuit shown in FIG. 3. The pulse discriminator generally indicated at 53, includes an AND gate 55 having two input terminals, the first of which is connected to the Schmidt trigger 43, and an output terminal which is connected to the infrared light source. The pulse discriminator also includes a timing device 57, with a predetermined cycle of operation, having an input terminal which is connected to the Schmidt trigger 43 and an output terminal which connected to the second input terminal of the AND gate 55. The AND gate 55 has the characteristic that a pulse must be supplied simultaneously to both of the input terminals before it will produce a pulse at the output terminal.

In operation, when the Schmidt trigger 43 supplies a pulse to the pulse discriminator 53, the incoming pulse is received by both the first input terminal of the AND gate 55 and the input terminal of the timing device 57. The incoming pulse initiates the operation of the timing device 57 which continues for a predetermined period of time. Upon completion of its cycle, the timing device 57 supplies a pulse to the second input terminal of the AND gate 55. If the incoming pulse has a duration greater than the predetermined period of time, then pulses will be applied simultaneously to both input terminals of the AND gate 55 which will thereupon produce a pulse at its output terminal which will actuate the infrared light source 45. However, if the incoming pulse does not have a duration as great as the predetermined period of time, then it will not be present at the first input terminal when the timing device 57 applies a pulse to the second input terminal and no pulse will be produced at the output terminal.

In FIG. 5 there is a pulse discriminator generally indicated at 53, having one form of an AND gate generally indicated at 55, shown schematically, which is operated by a timing device 57, shown in block form. The AND gate 55 includes a resistor 59 and switches 61 and 63, the resistor 59 having one end connected to a 12 volt power supply and the other end connected to ground by two parallel switches 61 and 63 both having first and second electrical conductance conditions. The first switch, generally indicated at 61, being a serially connected diode 65, having an anode 67 and cathode 69, and an impedance 71 of very small value compared to the value of the resistor 59 which could be the impedance of a transistor in the output stage of the Schmidt trigger 43, but for illustrative purposes is shown as a resistor. The second switch 63 is operated by a timing device 57, both of which are shown in block form and may, if desired, be conventional. The timing device 57 has an input terminal which is connected to the junction 73 between the cathode 69 of the diode 65 and the impedance 71, which forms the input terminal of the first switch 61 and, in turn, is connected to the Schmidt trigger 43. Connected between the resistor 59 and the parallel switches 61 and 63 is an output terminal which is connected to the infrared light source 45.

In the normal course of operation, current flows from the 12 volt source through the resistor 59, the diode 65, and the impedance 71, to ground, thereby clamping the output terminal, for all practical purposes, to ground potential. No current flows through the other switch 63 because it is normally open. When the Schmidt trigger 43 supplies a pulse to the pulse discriminator 53, the incoming pulse is received by the input terminals of both the first switch 61 and the timing device 57. The incoming pulse, which, for illustrative purposes, may have an amplitude of 12 volts, produces a voltage drop across the impedance 71 sufficient to reverse bias the diode 65 and thereby terminal conduction from the 12 volt source through the diode 65 and the impedance 71 to ground. However, the pulse initiates the operation of the timing device 57 which closes the second switch 63 so as to provide an alternate path for current to flow from the 12 volt source through the resistor 59 and the switch 63 to ground. This maintains the output terminal, for all practical purposes, at ground potential. After a period of time, the timing device 57 completes its cycle and causes the second switch 63 to open, thereby blocking conduction of the current from the 12 volt source to ground. When current ceases to flow from the 12 volt source through the resistor 59 to ground, the potential of the output terminal rises sharply to that of the 12 volt power supply, so long as the incoming pulse is still present at the input terminal to block conduction through the first diode 65, and thereby provides an actuating pulse for the infrared light source 45. If the incoming pulse has a duration less than the operating cycle of the timing device 57, then current will again flow from the 12 volt power supply through the first diode 65 to ground and again clamp the output terminal at ground potential before the timing device 57 completes its cycle and opens the second switch 63. Consequently, in the latter instance the incoming pulse will not result in a pulse being produced at the output terminal to actuate the light source 45.

In FIG. 6 is shown, schematically, a pulse width discriminator 53 according to the invention and comprising an AND gate, generally indicated at 55, and monostable multivibrator used as a timing device and generally indicated at 57. The AND gate 55 includes a resistor 59 having one end connected to a 12 volt power supply and the other end connected to ground by two parallel switches, generally indicated at 61 and 63, the first switch 61 being a serially connected diode 65, having an anode 67 and cathode 69, and an impedance 71 which may be the impedance of a transistor in the output stage of the Schmidt trigger 43, but for illustrative purposes is shown as a resistor. The second switch 63 is a diode 75, having an anode 77, and cathode 79, and a transistor 81, having an emitter 83, base 85, collector 87, which forms part of the monostable multivibrator. Connected to the junction between the cathode 61 of the first diode 65 and the impedance 71 and to the base 85 of the transistor 81 in the second switch 63, by means of a coupling capacitor 89, is the input terminal of the pulse discriminator 53 which is connected to the Schmidt trigger 43. Connected to the junction between the resistor 59 and the anodes 67 and 77 of the diodes 65 and 75 is the output terminal of the pulse discriminator 53 which is connected to the infrared light source 45. The monostable multivibrator, includes the above mentioned transistor 81, and another transistor 91, having an emitter 93, base 95, and collector 97 with both transistors 81 and 91 being connected to the 12 volt power supply by load resistors 99 and 101 respectively. The emitters 83 and 93 of the transistors 81 and 91 are connected together and grounded. Connected between the base and emitter of the transistors 81 and 91 are resistors 103 and 105 respectively, which serve to prevent leakage current from developing a voltage sufficient to overcome the forward bias of the transistors. A bias is provided for the base 95 of the transistor 91 by a resistor 107 and a forwardly biased diode, generally indicated at 109, having an anode 111 and a cathode 113, which are connected respectively between the 12 volt source and the base 95 of the transistor 91 to form a voltage divider with the resistor 105. Connected between the collector 87 of the transistor 81 and the junction 115 of the resistor 107 and the anode 111 of the diode 109 is a capacitor 117 which, in conjunction with resistor 107, provides a time constant for the monostable multivibrator. Connected between the collector 97 of the transistor 91 and the base 85 of the transistor 81 is a resistor 119 which, in conjunction with the resistors 101 and 103 forms a voltage divider to provide a bias for base 85 of the transistor 81.

In the normal steady state operation of the circuit shown in FIG. 6 the current flowing from the 12-volt power supply through the resistor 107, the diode 109, and the resistor 105 develops a voltage across the resistor 105 that forwardly biases the transistor 91 into conduction. As the transistor 91 is biased into conduction the current flowing through the resistor 101 causes the voltage at the collector 97 of the transistor 91 to decrease. The decreasing collector voltage of the transistor 91 is applied through the resistor 119 to the base 85 of the transistor 81 which biases it into non-conduction. With the transistor 81 non-conductive, the collector voltage of the transistor 81 becomes that of the 12-volt power supply and with the transistor 91 conductive the capacitor 117 is charged to the potential of the 12-volt power supply through the resistor 99, the diode 109 and the base-emitter path of the transistor 91. Since the cathode 77 of the diode 75 of the AND gate 55 is connected to the collector 87 of the transistor 81, the diode 75 is reversely biased by the potential of the collector 87 of the transistor 81. However, since the input terminal of the pulse discriminator 53 is connected to the Schmidt trigger 43 and normally maintained, for all practical purposes, at ground potential, the diode 65 which is connected thereto is forwardly biased and permits current to flow therethrough so as to provide a voltage drop from the 12-volt power supply across the resistor 59 to maintain the output terminal at ground potential.

When an incoming pulse resulting from a true target interrogation signal is applied to the input terminal of the pulse discriminator 53 at time $T_1$ as shown in FIG. 7, it reversely biases the diode 65 which terminates the flow of current from the 12 volt source through the resistor 59 and the diode 65 tending to cause the voltage at the potential of the output terminal to rise to the potential of the 12 volt power supply. However, the incoming pulse is also supplied through the coupling capacitor 89 to the base 85 of the transistor 81 thereby biasing it into conduction.

In FIG. 7 is shown at set of wave forms which illustrate the operation of the pulse discriminator 53 shown in FIG. 6 in response to an incoming pulse from the Schmidt trigger 43. For a pulse to be produced at the output terminal of the pulse discriminator 53, it is necessary for a positive pulse to be applied to the cathodes 69 and 79 of both diodes 65 and 75. The steady state operation of the circuit is indicated at time $T_0$. At the time $T_0$, the cathode 69 of the diode 65, which is connected to the input terminal of the pulse discriminator 53, is maintained, for all practical purposes, at ground potential since an incoming pulse is not present. This is shown in FIG. 7A. The cathode 79 of the diode 75, which is connected to the collector 87 of the transistor 81 is maintained at a 12 volt potential since the transistor 81 is non-conductive. This is shown in FIG. 7B. Since the cathode of one of the diodes, in this case 75, is maintained at ground potential, a pulse is not produced at the output terminal of the pulse discriminator 53 which is maintained at ground potential as shown in FIG. 7C. As the transistor 81 becomes conductive, current flows from the 12 volt power supply through the resistor 99, thereby causing the potential of the collector 87 of the transistor 81 to decrease. The decreasing potential of the collector 87 is applied through the capacitor 117 and the diode 109 to the base 95 of the transistor 91 thereby decreasing the conduction of the transistor 91. It will be recalled that the capacitor 117 was initially charged to the potential of the 12 volt power supply. However, the increasing conduction of the transistor 81 causes the capacitor 117 to discharge through the path formed by the resistor 107 and the transistor 81. The decreasing voltage at the junction between the resistor 107 and the diode 109 causes the diode 109 to become reversely biased thereby terminating the conduction of the transistor 91. As the transistor 91 becomes non-conductive, the current flowing from the 12 volt power supply through the resistor 107 and the collector-emitter path of the transistor 91 decreases resulting in the collector potential of the transistor 91 increasing to the potential of the 12 volt power supply. This increase in potential is applied through the resistor 119 to the base 85 of the transistor 81 and biases it more fully into conduction. It will be noted that the potential of the collector 87 of the transistor 81 initially reverse biased the diode 75 to prevent a current flow through the resistor 59 and the diode 75 to ground. However, as the transistor 81 becomes fully conductive, it clamps the potential of the cathode 77 of the diode 75, for all practical purposes, to ground which causes current to flow from the 12 volt power source through the resistor 59, the diode 75, and the emitter-collector path of the transistor 81 to ground thereby producing a voltage drop across the resistor 59 which, for all practical purposes, maintains the output terminal at ground potential. As a result, the incoming pulse supplied to the input terminal fails to produce a change in the potential in the output terminal as shown in FIG. 7C.

With the conduction of the transistor 81, the capacitor 117, which was initially charged to the potential of the 12 volt power supply, discharges through the transistor 81 and the resistor 107. As the capacitor 117 discharges, the transistor 91 is maintained non-conductive because the voltage drop across the resistor 59 is sufficient to reversely bias the diode 109. However, after a certain period of time, as determined by the time constant of the resistor 107 and the capacitor 117, the potential at the anode 111 of the diode 109 increases to a value such that the diode again becomes forwardly biased and permits current to flow through it, which develops a voltage across the resistor 105 which forwardly biases the transistor 91 into conduction. As the transistor 91 begins to conduct, current flows through the resistor 101 which results in a decreasing potential at the collector 97 of the transistor 91. This decreasing potential is applied through the resistor 119 to the base 85 of the transistor 81 which decreases the forward bias of the transistor 81. The diminishing bias supplied to the transistor 81 causes the current flowing through the resistor 99 to decrease which results in an increasing potential at the collector 87 of the transistor 81. The increasing collector potential of the transistor 81 is applied through the diode 109 to the base of the transistor 91 to increase the conduction thereof. The effect is regenerative and results in transistor 91 becoming fully conductive and the transistor 81 becoming non-conductive. As a result, the cathode 79 of the diode 75 is again reversely biased and the current flowing through resistor 59, the diode 75, and the transistor 81 is terminated. Since the incoming pulse resulted from the detection of a true target interrogation signal, which is selected to have a duration greater than the operating cycle of the monostable multivibrator, it maintains the diode 65 reversely biased and the potential of the output terminal of the pulse discriminator 53 rises to that of the 12 volt power supply to produce a pulse which is supplied to the infrared source 45 at the time $T_2$ as shown in FIG. 7. When the incoming pulse terminates, at time $T_3$, the output terminal returns to ground potential.

Suppose that the incoming pulse resulted from the detection of a noise signal having a duration less than the operating cycle of the monostable multivibrator. Such a pulse is shown at time $T_4$ in FIG. 7A. The operation of the circuit is generally the same as hereinbefore described, except that since the incoming pulse terminates at $T_5$, as shown in FIG. 7A, before the operating cycle of the monostable multivibrator ends, the potential of the output terminal remains clamped to ground by the diode 75 and the transistor 81 and a pulse is never produced at the output terminal as shown in FIG. 7C. In addition, it should be noted that the termination of the incoming pulse at time $T_5$, while the transistor 81 is still conducting, causes a negative pulse to be supplied to the base 85 of the transistor 81 through the coupling capacitor 89 which abruptly stops the operation of the multivibrator and returns the circuit to a steady state condition.

In FIG. 8 is shown another embodiment of pulse discriminator 53 according to the invention, and having a timing device, generally indicated at 57, which is connected between the Schmidt trigger 43 and the infrared light source 45 so as to prevent an actuating pulse from being supplied to the infrared light source 45 in response to an incoming pulse resulting from the detection by the radio frequency receiver 41 of a noise signal having a duration less than 75 microseconds. The pulse discriminator 53 shown in FIG. 8 includes an input terminal connected to ground by means of an impedance, generally indicated at 71, which might be part of the output stage of the Schmidt trigger 43, but in this instance is illustrated as two serially connected resistors 139 and 141. The junction between the resistors 139 and 141 is connected to the base 123 of the transistor 125 having a collector 127 and an emitter 129 which acts as a first switch 61. The collector-emitter path of the transistor 125 is connected in parallel with a capacitor 131, and the junction between the emitter 129 of the transistor 125 and one terminal of the capacitor 131 is connected to ground. The junction 133 between the collector 122 of the transistor 125 and the other terminal of the capacitor 131 is connected to a 12 volt power supply by means of a rheostat 135 thereby forming a timing device 57. The junction 133 between the rheostat 135 and the capacitor 131 is connected to another Schmidt trigger circuit 137 which acts as a second switch and, in turn, is connected to the infrared light source 45.

In the normal steady state operation of the circuit, the 12 volt power supply provides a charging current through the rheostat 135 to the capacitor 131. A positive potential is normally applied to the input terminal of the pulse discriminator 53 which forwardly biases the transistor 125 into conduction and clamps the junction 133 between the capacitor 131 and the rheostat 135 to ground potential thereby preventing the capacitor 131 from charging. Since the capacitor 131 is prevented from charging, the potential applied to the second Schmidt trigger 137 is essentially ground and the second Schmidt trigger 137 does not supply an actuating pulse to the infrared light source 45.

In FIG. 9 is shown a set of wave forms which illustrate the operation of the pulse discriminator 53 shown in FIG. 8 in response to an incoming pulse from the first Schmidt trigger 43. For a pulse to be produced at the output terminal of the pulse discriminator 53, it is necessary for an incoming pulse to be present at the input terminal of the pulse discriminator 53 when the potential at the junction 153 between the resistor 175 and the capacitor 131 attains a value sufficient to operate the second Schmidt trigger 137 to supply an actuating pulse to the infrared light source 45. The steady state operation is indicated at time $T_0$ in FIG. 9 wherein FIG. 9A indicates the potential of the input terminal of the pulse discriminator 53; FIG. 9B indicates the potential at the junction 133 between the rheostat 135 and the capacitor 131; and FIG. 9C indicates the potential at the output terminal of the pulse discriminator 53.

When an incoming pulse, resulting from the detection of a true target interrogation signal, is applied to the input terminal of the pulse discriminator 53, at time $T_1$ as shown in FIG. 9, it removes the forward bias applied to the transistor 125 which thereupon becomes non-conductive and permits the capacitor 131 to charge toward the trigger level of the second Schmidt trigger 137. Since the incoming pulse resulted from the detection of a true target interrogation signal, which is selected to have a duration greater than the operating cycle of the RC timing device 57, that is the time necessary for the potential at the junction 133 between the rheostat 135 and the capacitor 131 to rise to a level that will operate the second Schmidt trigger 137, the capacitor 131 charges to the level of potential, at time $T_2$, which operates the second Schmidt trigger 137 and causes an actuating pulse to be supplied to the infrared source 45 as shown in FIG. 9C. At a later time, $T_3$, the incoming pulse terminates and the transistor 125 is again forwardly biased into conduction, thereby discharging the capacitor 131 and terminating the positive actuating pulse supplied to the infrared source 45 by the second Schmidt trigger 137.

If the incoming pulse resulted from the detection of a noise signal having a duration less than the operating cycle of the timing device 57, as shown in FIG. 9A at time $T_4$, then the operation of the circuit is generally the same as hereinebfore described, except that, since the incoming pulse terminates before the capacitor 131 charges to a level of potential sufficient to operate the second Schmidt trigger 137, an actuating pulse is never supplied to the infrared light source 45, and when the incoming pulse terminates, is again forwardly biased into conduction thereby discharging the capacitor 131 and resetting the RC timing device 57.

While only a limited number of embodiments have been illustrated and described, it will be apparent to those skilled in the art that various modifications and improvements may be made without departing from the scope and operation of the invention. Accordingly, it is to be understood that the invention is not to be limited by the illustrated embodiments, but only by the scope of the appended claims.

That which is claimed is:

1. In a simulated hit indicator arrangement including a weapon having a barrel with a photoelectric target signal responsive telescope detector arrangement mounted thereon, and a weapon firing mechanism operatively associated with a target-interrogating transmitter; a target with a receiver operatively connected to a light source by means of a trigger circuit and a pulse discriminator having a timing device, wherein said pulse discrimnator has:

an input terminal adapted to receive from said trigger circuit a pulse resulting from the detection of a signal by said receiver;

an output terminal adapted to supply an actuating pulse to said light source; and means connected between said input and said output terminals and operative in response to an incoming pulse at said input terminal to supply an actuating pulse to said output terminal after a predetermined period of time as determined by said timing device provided the incoming pulse has a duration greater than said predetermined period of time.

2. In a simulated hit indicator arrangement as defined in claim 1 wherein said pulse discriminator includes:

first and second switches both having first and second electrical conductance conditions;

said input terminal being connected in controlling relation to said first switch and a timing device having a predetermined operation cycle, said timing device being connected in controlling relation to said second switch;

said first switch being changed from said first electrical conductance condiiton to said second electrical conductance condition in response to an incoming pulse from said trigger circuit being applied to said input terminal, and said operating cycle of said timing device also being initiated by said incoming pulse;

said second switch being changed from said second electrical conductance condition to said first electrical conductance condition in response to the initiation of the operation of said timing device;

said second switch being changed from first electrical conductance condition to said second electrical conductance condition in response to the termination of the operation of said timing device after said predetermined period of time so as to supply an actuating pulse to said light source at said output terminal providing said first switch remains in said second electrical conductance condition.

3. In a simulated hit indicator arrangement as defined in claim 2 wherein:

said first and second switches constitute first and second inputs of a gate circuit having an output which is connected to supply an actuating pulse to said light source and said first switch being connected to receive said incoming pulse from said trigger circuit;

said timing device having a predetermined operating cycle with an input terminal connected to receive said incoming pulse from said trigger circuit and an output terminal connected in controlling relation to said second switch;

said timing device providing a pulse to said second input of said gate which thereupon causes an actuating pulse to be supplied to said light source by said gate output providing said incoming pulse has a duration greater than the operating cycle of said timing device and is present at said first input of said gate.

4. In a simulated hit indicator arrangement as defined in claim 3 wherein:

said first and second switches of said gate are connected through a resistor to a source of power and said output terminal is connected between said switches and said resistor to said light source;

said first switch comprises a diode connected through an impedance to ground;

said input terminal, which is adapted to receive said incoming pulse from said trigger circuit, is connected between said diode and said impedance and to said timing device which is connected between said first and second switches;

said first switch being normally in said first electrical conductance condition and thereby permitting current to flow through the resistor and said first switch thereby preventing an actuating pulse from being supplied to said light source and said second switch normally being in said second electrical conductance condition thereby preventing current flow through the resistor to ground;

said incoming pulse from said trigger circuit operates said first switch thereby changing it from said first electrical conductance condition to said second electrical conductance condition which prevents current from flowing through said switch, and initiating the operating of said timing device which changes said second switch from said second electrical conductance condition to said first electrical conductance condition thereby permitting current to flow through said resistor and said second switch thereby preventing an actuating pulse from being supplied to said light source;

said second switch returning to said first electrical conductance condition upon termination of the operating cycle of said timing device thereby blocking current flow through said resistor and causing an actuating pulse to be supplied to said light source providing said incoming pulse maintains said first switch in said second electrical conductance condition.

5. In a simulated hit indicator arrangement as defined in claim 4 wherein:

said timing device comprises a monostable multivibrator having two transistors with emitter, base, and collector terminals, wherein one of said transistors forms a part of said second switch, and said input to the base of said transistor is connected between said diode and said impedance of said first switch.

6. In a simulated hit indicator arrangement as defined in claim 5 wherein:

said resistor is connected to the collector terminal of said transistor which forms a part of said second switch by means of the anode-cathode path of a diode, and said input to the base of said transistor is connected between said diode and said impedance of said first switch by means of a coupling capacitor.

7. In a simulated hit indicator arrangement as defined in claim 2 wherein:

said incoming pulse causes said first switch to change from said first electrical conductance condition to said second electrical conductance condition thereby initiating the operation of said timing device;

said timing device, after a predetermined period of time, operates said second switch and causes it to change from said second electrical conductance condition to said first electrical conductance condition thereby supplying an actuating pulse to said light source provided said incoming pulse maintains said first switch in said second electrical conductance condition.

References Cited

UNITED STATES PATENTS 3,104,478   9/1963   Strauss et al. _____ 35—25

EUGENE R. CAPOZIO, Primary Examiner.

PAUL V. WILLIAMS, Assistant Examiner.

U.S. Cl. X.R.

273—101.2; 343—112